(12) United States Patent
Allen

(10) Patent No.: US 8,500,110 B2
(45) Date of Patent: Aug. 6, 2013

(54) PANEL MOUNT

(75) Inventor: Warwick James Allen, North Shore (NZ)

(73) Assignee: Glass Vice Holdings Limited, Auckland (NZ)

( * ) Notice: Subject to any disclaimer, the term of this patent is extended or adjusted under 35 U.S.C. 154(b) by 578 days.

(21) Appl. No.: 12/452,466

(22) PCT Filed: Jul. 3, 2008

(86) PCT No.: PCT/NZ2008/000158
§ 371 (c)(1),
(2), (4) Date: May 20, 2010

(87) PCT Pub. No.: WO2009/005376
PCT Pub. Date: Jan. 8, 2009

(65) Prior Publication Data
US 2010/0225040 A1    Sep. 9, 2010

(30) Foreign Application Priority Data

Jul. 3, 2007 (NZ) ........................................ 556329
Jan. 15, 2008 (NZ) ........................................ 565118

(51) Int. Cl.
*B25B 1/24* (2006.01)
*B23P 11/00* (2006.01)

(52) U.S. Cl.
USPC ............................................ 269/297; 269/30

(58) Field of Classification Search
USPC .................. 269/297, 30; 254/131, 134
See application file for complete search history.

(56) References Cited

U.S. PATENT DOCUMENTS

| 2,605,795 | A | * | 8/1952 | Tracy | 269/133 |
| 4,054,268 | A | | 10/1977 | Sher | |
| 4,680,903 | A | | 7/1987 | Horgan, Jr. | |
| 4,837,993 | A | | 6/1989 | Studenski | |
| 5,395,101 | A | * | 3/1995 | Takimoto et al. | 269/289 R |
| 6,019,360 | A | * | 2/2000 | Rice | 269/296 |
| 6,254,077 | B1 | * | 7/2001 | Riley, Jr. | 269/287 |
| 6,434,905 | B1 | | 8/2002 | Sprague | |
| 6,663,123 | B1 | * | 12/2003 | Kovacs | 280/79.7 |
| 7,314,215 | B2 | * | 1/2008 | Vosoughkia | 269/296 |
| 7,806,394 | B2 | * | 10/2010 | Wuerthner | 269/133 |

FOREIGN PATENT DOCUMENTS

| FR | 1560400 | 3/1969 |
| FR | 1574050 | 7/1969 |
| WO | WO 03/091516 | 11/2003 |

OTHER PUBLICATIONS

International Search Report dated Oct. 16, 2008.

* cited by examiner

*Primary Examiner* — Lee D Wilson
(74) *Attorney, Agent, or Firm* — Jacobson Holman PLLC

(57) ABSTRACT

A panel mount for non penetrative fastening of a panel (such as a glass pane). The panel mount has clamp jaws defining an elongate slot in which an edge of a panel can be received. A foot is provided for mounting and fastening the clamp jaws to a structure. At least one of the clamp jaws carries at least one threaded fastener that can be actuated by a user, including when the foot is fastened to the structure. The threaded fastener(s) of the at least one clamp jaw, in cooperation with the other clamping jaw, is capable of operatively clamping the panel to hold it in the slot, irrespective of any non-parallel disposition of the plane of the panel to the elongate direction of the slot.

22 Claims, 11 Drawing Sheets

PANEL MOUNT

This is a national stage of PCT/NZ08/000158 filed Jul. 3, 2008 and published in English, which has a priority of New Zealand no. 556329 filed Jul. 3, 2007 and New Zealand no. 565118 filed Jan. 15, 2008, hereby incorporated by reference.

FIELD OF THE INVENTION

The present invention relates to a panel mount for mounting a panel such as a glass pane.

BACKGROUND

Glass panes are used in buildings for many purposes. Glass panes can offer partitions within offices, showers, as a guard rail around an edge with a drop off, as fencing for a pool and the like.

Such glass panes are normally of a reinforced glass that has substantial impact or break resistance. Post production workability of such glass can be difficult.

Mounting of such glass panes can be cumbersome. The glass panes are heavy. They are inflexible. They can be difficult and time consuming to drill.

Means for mounting glass panes are known. By way of example U.S. Pat. Nos. 6,434,905, 4,837,993 illustrate ways in which a glass pane may be mounted. However these means for mounting do not readily lend themselves to the mounting of glass panes that may not necessarily align with the slot that is provided for receiving the glass pane. Alignment of the slot with the glass pane and/or vice versa can be a time consuming exercise. Particularly where for example such glass panes are mounted from a fixed structure of a building to which the brackets themselves need to be secured. The brackets themselves, secured to a fixed structure may not present the slot in the desired orientation to receive and hold the glass pane in its desired position.

WO03/091516 illustrates a device for supporting a glass pane. Such a device may be used in combination with other like devices that are for example mounted in concrete or to concrete to support the glass pane along its edge. Where multiple devices are used, alignment of each device with the glass pane as well as with each other becomes important. Use of the invention of WO03/091516 requires the glass to be drilled. This means that both slot alignment between multiple devices and spacing between devices is necessary to secure a glass pane.

Accordingly it is an object of present invention to provide a panel mount to provide improvements to known means for mounting a panel and/or that has the capacity to accommodate with slight misalignment relative to the desired position of glass to be held and/or that will at least provide the public with a useful choice.

BRIEF DESCRIPTION OF THE INVENTION

In a first aspect the present invention consists in a panel mount for non penetrative fastening of a panel (such as a glass pane), said panel mount comprising:

clamp jaws defining an elongate slot in which an edge of a panel can be received, a foot for mounting and fastening said clamp jaws to a structure, at least one of said clamp jaws holding at least two spaced apart threaded fasteners that can be actuated by a user, at least one clamp member located intermediate of said threaded fasteners and one side of said panel (when received in said slot), at least one base member of a configuration to be contiguous an edge of the panel when located in said slot, to operatively act as a partial extension of the panel and positioned such that at least one of said threaded fasteners can act thereon (directly or indirectly), the threaded fasteners, in cooperation with the clamp jaws, capable of operatively clamping said panel to hold it in said slot.

Preferably the base member is of the same width (being in a direction in which the same as force of clamping acts) as the thickness of the panel.

Preferably the foot and the clamp jaws are integrally formed.

Preferably the foot is engaged to the clamping jaws.

In a second aspect the present invention consists in a panel mount for non penetrative fastening of a panel (such as a glass pane), said panel mount comprising.

a housing that includes a slot to receive the edge of a panel, the housing defining a cavity that include at least one opening on at least one side of the slot and at the base of the slot, a base member positioned in a location to act as an extension of and to be contiguous with the panel at an edge of the panel within said cavity, an elongate clamp member located in said cavity in a manner to allow it to move in a direction normal to the panel and, via said at least one opening, can effect a clamping force onto the panel in conjunction with resistance to movement of the panel offered by the housing from the other side of the slot, the clamping force being effected by at least two fasteners carried by the housing, a first fastener that acts to apply a force in a direction normal to the panel onto the elongate clamp member and a second fastener that acts to apply a force in a direction normal to the panel and onto the base member.

Preferably there are two clamp members that each extend on a separate side of the panel (when located in the slot) and that each extend on a separate side of the base member.

Preferably there are two pairs of fasteners each having one fastener on each side of the panel and each fastener of a said pair located to act in opposite directions.

Preferably the panel is retained between the two clamp members upon a tightening of the fasteners.

Preferably a first of the pair of fasteners is located to apply a force acting through the base member.

Preferably a second of the pair of fasteners is located to apply a force acting through the panel and adjacent the edge of the panel when located in the slot.

Preferably a second of the pair of fasteners is located to apply a force onto said clamp members and acting through and normal to the panel and adjacent the edge of the panel when located in the slot.

Preferably a third pair of fasteners is provided that is located to act on the clamp members at a location proximate to the mouth of the slot.

Preferably the cavity includes an opening at the base of the housing to allow the at least one clamp member and base member to be inserted in to the housing.

Preferably said at least one opening of the cavity is an elongate slot.

Preferably said at least one opening of the cavity is at least one hole.

Preferably there is one of said at least one openings for each of the clamping members.

Preferably the base member is substantially of the same thickness as the panel.

Preferably a packer is located between each clamp member and the panel.

Preferably the packer is also located between each clamp member and the base member.

Preferably the fasteners are threaded fasteners.

Preferably the housing includes apertures to receive the fasteners the apertures including an opening to the cavity to allow the fasteners to act (directly or indirectly) onto a respective the clamp member and said base member.

Preferably the slot is a U-shaped slot.

In a further aspect the present invention consists in a panel mount for non penetrative fastening of a panel (such as a glass pane), said panel mount comprising.

a housing that includes a slot to receive the edge of a panel, the housing also including at least one cavity defining an elongate opening to and on each side of the slot, for each side of the panel, an elongate clamp member located at least in part within said cavity in a manner to allow it to operatively move in a direction parallel to the normal to the panel to effect a clamping force in conjunction with resistance to movement of the panel offered from the other side of the slot by the other elongate clamp member onto the panel a base member located between the two clamp members and adjacent an edge of the panel and of a configuration to allow the clamp members to also effect a clamping force onto the base member, the clamping force being effected by at least two pairs of fasteners carried by the housing, each fastener of a pair to apply a clamping force in opposite directions, the first of a pair of fasteners acting to apply a clamping force passing through the base member and a second of a pair of fasteners to apply a clamping force passing through the panel adjacent an edge of the panel when located within the slot.

In still a further aspect the present invention consists in a panel mount for non penetrative fastening of a panel (such as a glass pane), said panel mount comprising:

clamp jaws defining an elongate slot in which an edge of a panel can be received, a foot for mounting and fastening said clamp jaws to a structure, at least one of said clamp jaws carrying at least one threaded fastener that can be actuated by a user, including when said foot is fastened to said structure, the threaded fastener(s) of said at least one clamp jaw, in cooperation with the other clamping jaw, capable of operatively clamping said panel to hold it in said slot, irrespective of any non-parallel disposition of the plane of said panel to the elongate direction of said slot.

Preferably each clamp jaw carries at least one threaded fastener that can be actuated by a user, including when said foot is fastened to said structure, the threaded fastener(s) of each clamping jaw, in cooperation with the or each other threaded fastener, capable of operatively clamping said panel to hold it in said slot, irrespective of any non-parallel disposition of the plane of said panel to the elongate direction of said slot.

Preferably said foot includes a means to fasten, to fasten to or with said structure.

Preferably there is at least one pair of clamp jaws.

Preferably each clamp jaw defines an elongate rectilinear slot.

Preferably a mouth opening is defined by the distal ends of each slot and through which part of said panel can enter said slot.

Preferably said clamp jaws are, at their proximal end, engaged to said foot.

Preferably said foot is a foot plate positioned so that the elongate slot extends in a direction normal to the plane of said foot plate.

Preferably said threaded fasteners are engaged to said clamp jaws to move in a direction lateral to the elongate direction of said slot (and preferably normal to the plane of the panel).

Preferably said threaded fasteners can extend into said slot.

Preferably an intermediate member is located between a or all said threaded fasteners and, when in situ, said panel.

Preferably said intermediate member is a protective member that prevents direct contact of said threaded fasteners with said panel.

Preferably said intermediate member is a planar member or elongate member that extends parallel to the elongate direction of the slot.

Preferably a said intermediate member is located at each side of said slot, each intermediate member to be reacted on by a or the threaded fasteners held by one of the clamp jaws.

Preferably each said intermediate member extends from said distal end of each said clamp jaw to or towards the opposite end of said slot.

Preferably each said threaded fastener is located in a threaded hole passing through a respective clamp jaw.

Preferably the slot defined by said clamp jaws terminates short of the foot at a slot base.

Preferably said base is able to engage with an edge of said panel.

Preferably said threaded fasteners can be actuated by a user when the panel mount is fastened to the fixed structure.

Preferably the panel mount is one that is used as part of a glass pane incorporating balustrade system.

Preferably the panel mount is one that is used as part of a glass pane defined fence.

Preferably the panel mount is one that is used as part of a glass pane defined wall.

Preferably said slots are open sided.

In a further aspect the present invention consists in a method of mounting a panel (such as a glass pane) relative a fixed structure, comprising:

securing, in a spaced apart configuration to a fixed structure, at least two panel mounts as claimed in any one of the preceding claims in a condition wherein their slots are substantially in alignment, inserting a panel into the slot of each panel mount, holding the panel in the desired position, adjusting the threaded fasteners to clamp said panel in place in said desired position.

In a further aspect the present invention consists in a panel defined wall, partition or fence or panel including balustrade system wherein a panel is edge supported by at least one panel mount as herein before described.

In still a further aspect the present invention consists in a panel mount as herein described with reference to any one of the drawings.

Preferably the means to fasten is an aperture passing through said foot to allow a fastener to pass there through and secure said panel mount to said structure.

Preferably the means to fasten is a fastener that projects in a direction away from said elongate body to pass into an aperture of said structure and secure said panel mount to said structure.

Preferably the structure is a floor, beam, bearer or pad.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

This invention may also be said broadly to consist in the parts, elements and features referred to or indicated in the specification of the application, individually or collectively, and any or all combinations of any two or more of said parts, elements and features, and where specific integers are mentioned herein which have known equivalents in the art to which this invention relates, such known equivalents are deemed to be incorporated herein as if individually set forth.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

BRIEF DESCRIPTION OF THE DRAWINGS

A preferred form of the present invention will now be described with reference to the figures in which.

DETAILED DESCRIPTION OF THE INVENTION

Figure 1:
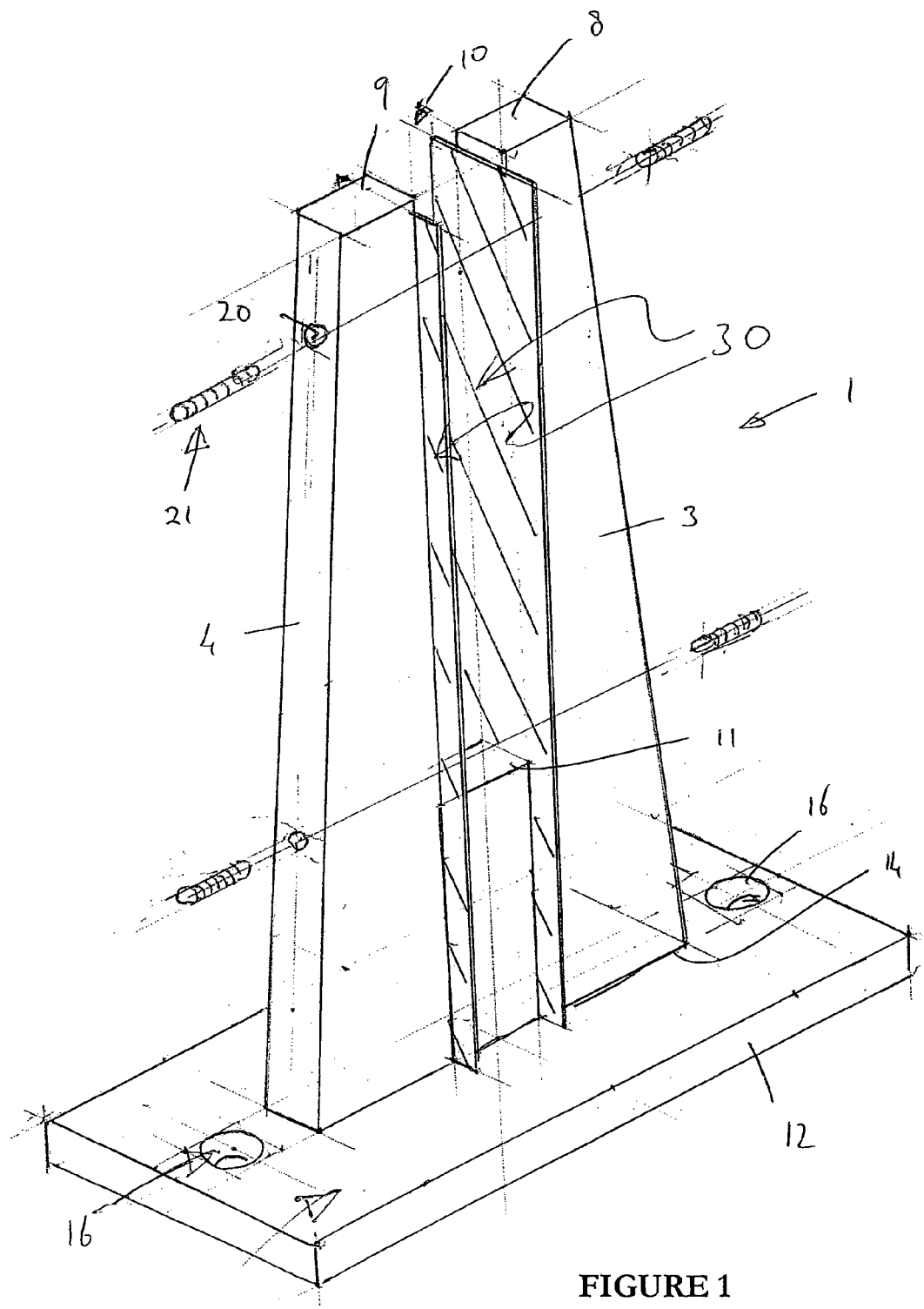
FIG. 1 illustrates a panel mount.
Figure 2:
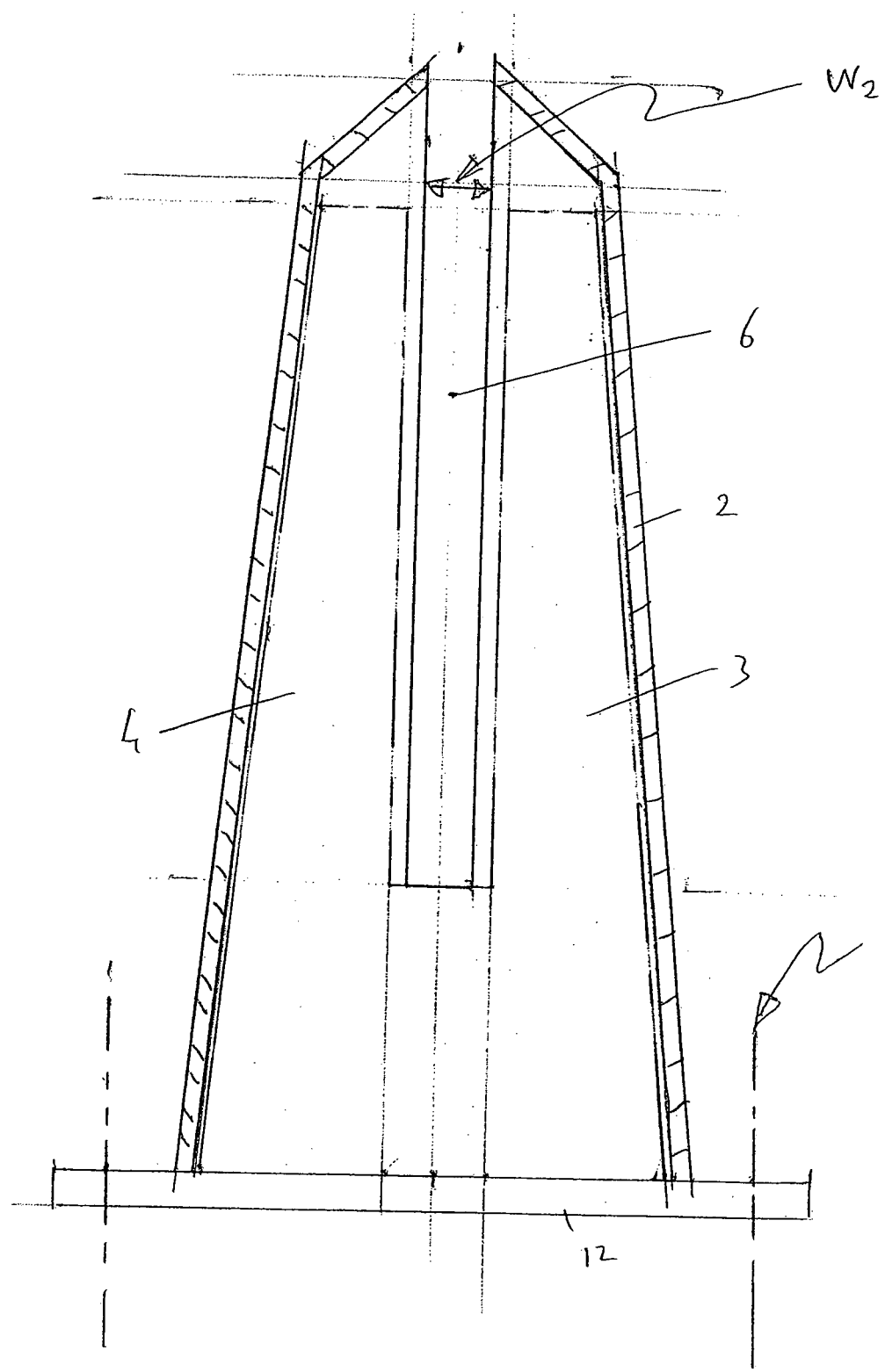
FIG. 2 illustrates a front view of the panel mount that also includes the shroud.

With reference to FIG. 1 there is shown a first version of a panel mount 1. It is shown partially exploded, and absent of a shroud that may be used. With reference to FIG. 2 the preferred shroud 2 is shown.

With reference to FIG. 1, the panel mount 1 includes clamping jaws 3, 4. The clamping jaws define a slot 6 therebetween. The slot 6 is an elongate slot that in the preferred mode of use extends vertically. The slot, at the distal ends 8, 9 of the clamp jaws 3, 4 presents a mouth opening 10 into and through which an edge of a glass pane can be received.

Whilst in this form the panel mount as herein described is designed for use with a glass pane, it will be appreciated by a person skilled in the art that other forms of building panels may be used in combination with panel mounts of the present invention. The present invention lends itself particularly suitable for use with a glass pane since the invention does not require for holes to be drilled through the glass pane for the purposes of mounting of the glass pane by the panel mount.

The slot receives the glass pane by passing the pane through the mouth 10. However the slot also includes side openings to allow sliding location of the glass pane therethrough. The slot from its mouth 10 to its base 11 is preferably of a length that stops short from the foot 12.

The foot 12 can mount the panel mount to a fixed structure. The clamp jaws 3, 4 are preferably directly engaged and supported by the foot 12. The panel mount may be made as a unitary member or alternatively may be fabricated from several members. Where it is fabricated, the jaws 3, 4 may for example be welded to the foot 12.

Figure 3:
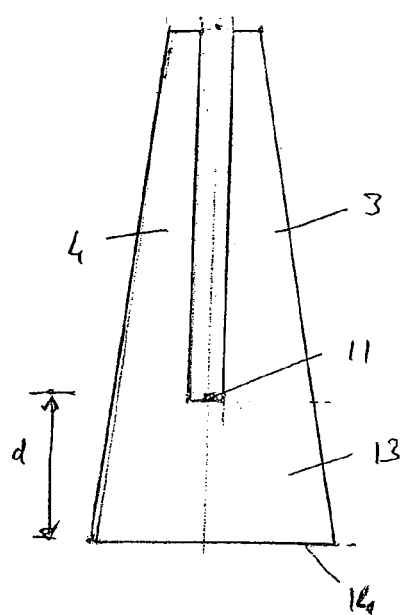
FIG. 3 is a front view of the clamping jaws.
Figure 4:
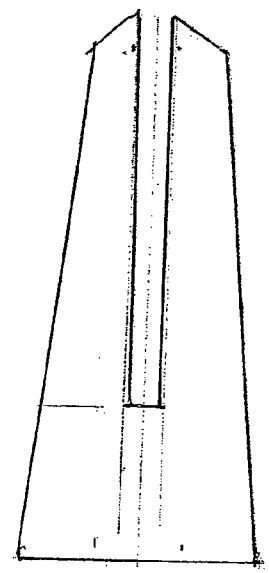
FIG. 4 is a front view of the shroud.
Figure 5:
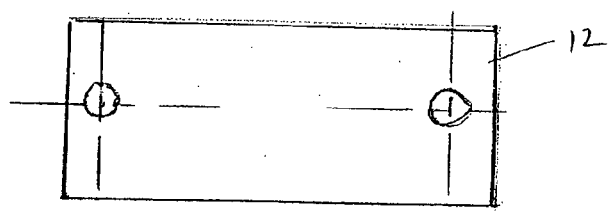
FIG. 5 is a plan view of the foot.
Figure 6:
FIG. 6 is a front view of the packing.
Figure 7:
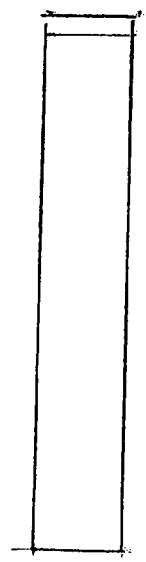
FIG. 7 is a side view of FIG. 4.

The clamp jaws 3, 4 are preferably of a unitary body as for example shown with reference to FIG. 3. The unitary body 13 includes a base portion at where the clamp jaws 3, 4 are affixed to or from which the foot 12 extends. As can be seen the base 11 of the slot does not extend to the proximal end 14 at where the foot 12 is fixed. The distance D defines the separation of the bottom edge of a glass pane, to the floor where for example the foot 12 is to be mounted.

The foot 12 includes means 16, for fastening the foot to a fixed structure of a building. The means 16 in the preferred form are apertures through which a penetrative fastener can extend for securing the foot to the fixed structure. Such penetrative fasteners may be screws, dyna bolts, or other, selected for suitable use with the materials of the fixed structure to which the panel mount is to be mounted.

Figure 10:
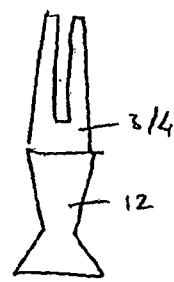
FIG. 10 shows a variation of the foot shape of the mount.

Alternative means to fasten the foot 12 to the fixed structure may be provided. The foot 12 may include rods to be cast into a suitable material such as concrete or resin. The foot may be a stud or footing as shown in FIG. 10 to be set into concrete or resin.

One and preferably each of the clamp jaws 3, 4 includes at least one aperture 20 to receive a threaded fastener 21. As can be seen in FIG. 1, each clamp jaw includes 2 apertures to each receive a threaded fastener. In the preferred form apertures are provided for each clamp jaw 3, 4. The threaded fasteners may be otherwise disposed to, or from the jaws.

Each threaded fastener can be actuated by a user by for example using a tool such as a screw driver or allen key. In the most preferred form the threaded fasteners are grub screws. The fasteners may extend into the slot to operatively engage with a pane that is received in the slot. Alternatively the threaded fasteners may actuate an intermediate member that engages directly against the pane. However it may be that the threaded fasteners may make direct contact with the pane, or each may have a shoe to contact the panel.

In FIG. 1, intermediate members 30 are shown. The intermediate members 30 are for example packers or spacers that are positioned intermediate of a pane in the slot and each of the threaded fasteners. They may be strips of a material such as a metal or plastic that is provided at each of the sides of the slot as shown in FIG. 1. They may be flexible so as to deflect when the threaded fasteners are moved to engage thereon. The packers may be of a material (or include a material) that has a high coefficient of friction with the material of the panel.

Figure 8:
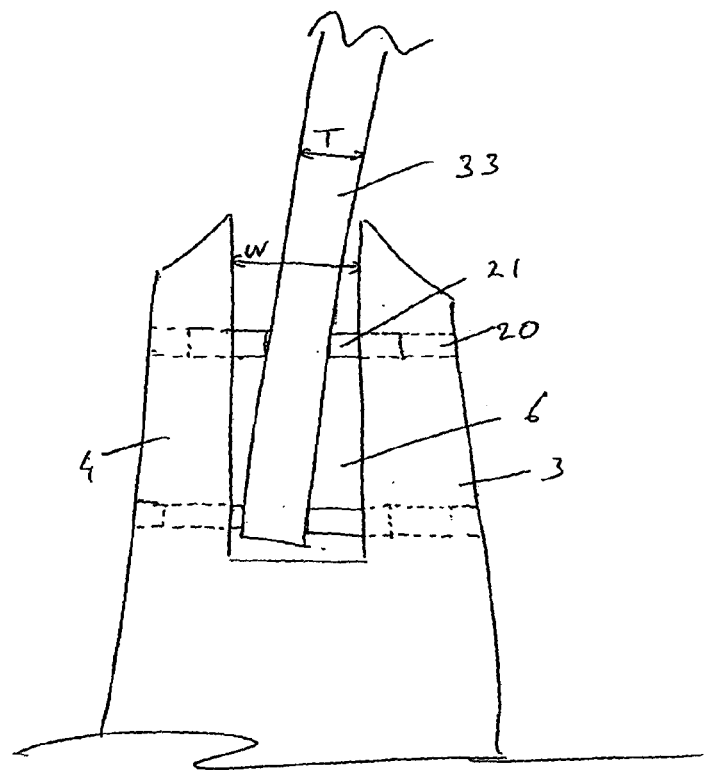
FIG. 8 is a front view of part of a panel mount illustrating a panel in situe.

With reference to FIG. 8, there is illustrated part of the panel mount of the present invention. The width "W" of the slot is greater than the thickness "T" of the pane 33. The width "W" is sufficient to allow for at least some misalignment of the pane 33 to occur with the elongated direction of the slot 6. When affixed to a fixed structure the slot may not be presented in a position that perfectly aligns with the position that the pane 33 is desired to be in. Misalignment can be accommodated by the slot 6 due to the size of the slot being larger than the thickness of the pane. With the use of the threaded fasteners the pane, despite not being perfectly aligned within the slot, can still be clamped through the cooperation of the threaded fasteners with each other.

In use, the panel mount is firstly mounted to a fixed structure in a position that is, as best as possible, provided to present the slot in alignment with the desired position of the pane 33. A pane is then inserted into the slot 6 and held in its desired position. A person can then actuate the threaded fasteners 21 so as to clamp the pane 33 and hold it in the slot.

Once the pane is secured, a shroud 2 may be positioned over the clamp jaws 3, 4 so as to obscure these from sight. The shroud 2 preferably also includes a slot that may be of a size smaller than the slot 6. The slot of the shroud 2 may be of a width "W-2" that is smaller than the width "W" of the slot 6. The slot of the shroud may be of a flexible nature so that it can be at least to some extent compliant to a misaligned positioning of the panel 33 in the slot 6. The shroud 2 may also cover the foot or part of the foot 12.

The shroud may include apertures therethrough to allow for a tool to reach the threaded fasteners that are carried by the clamp jaws 3, 4. The shroud may be permanently affixed to the clamping jaws and/or the foot. The construction can improve the strength of the mount.

Alternatively the shroud may not include such apertures.

Figure 9:
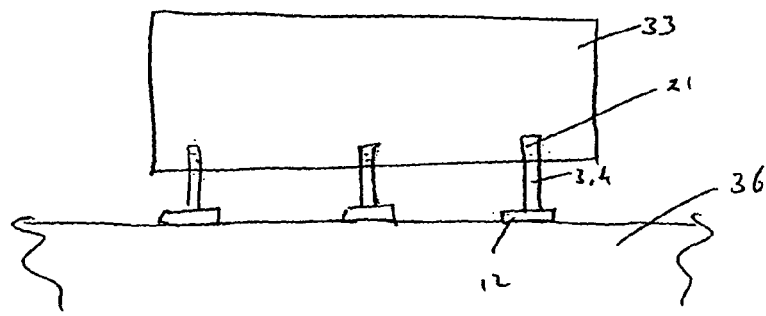
FIG. 9 is a front view of a pane supported by a plurality of panel mounts.

With reference to FIG. 9 there is shown a pane 33 supported by 3 panel mounts relative to a fixed structure 36.

The mount can more conveniently receive and secure panels and can also allow for subsequent adjustment to occur without needing to remove the mount from the structure. It also does not require the panel to be machined, such as by drilling, to become secured.

FIGS. 11-14 show another form of a panel mount. The panel mount comprises a housing 50 which is or can be affixed to a fixed structure such as a deck in similar(s) as described above.

Figure 11:
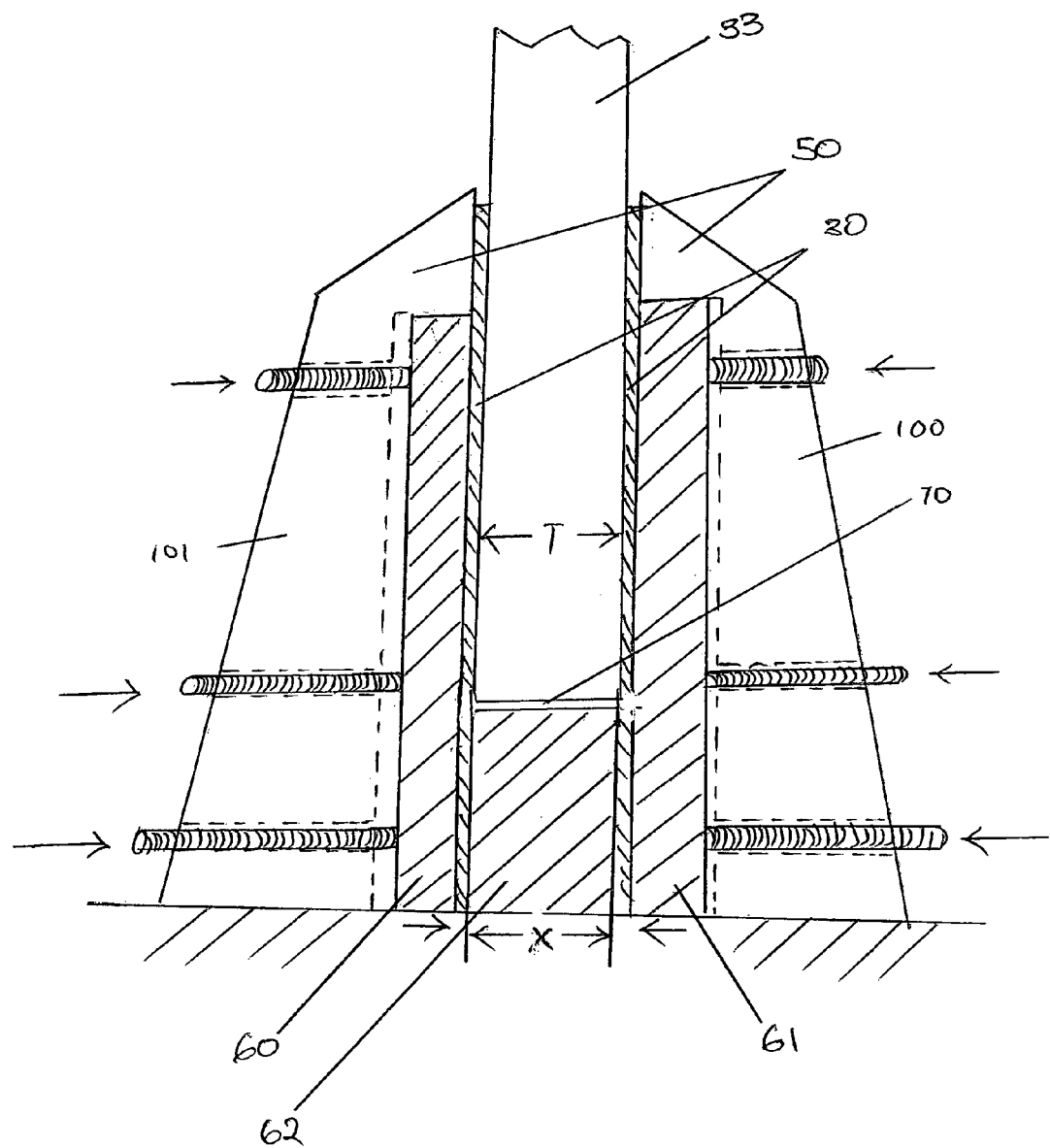
FIG. 11 shows a cross-sectional view of the panel mount with the housing and the clamping members.
Figure 12:
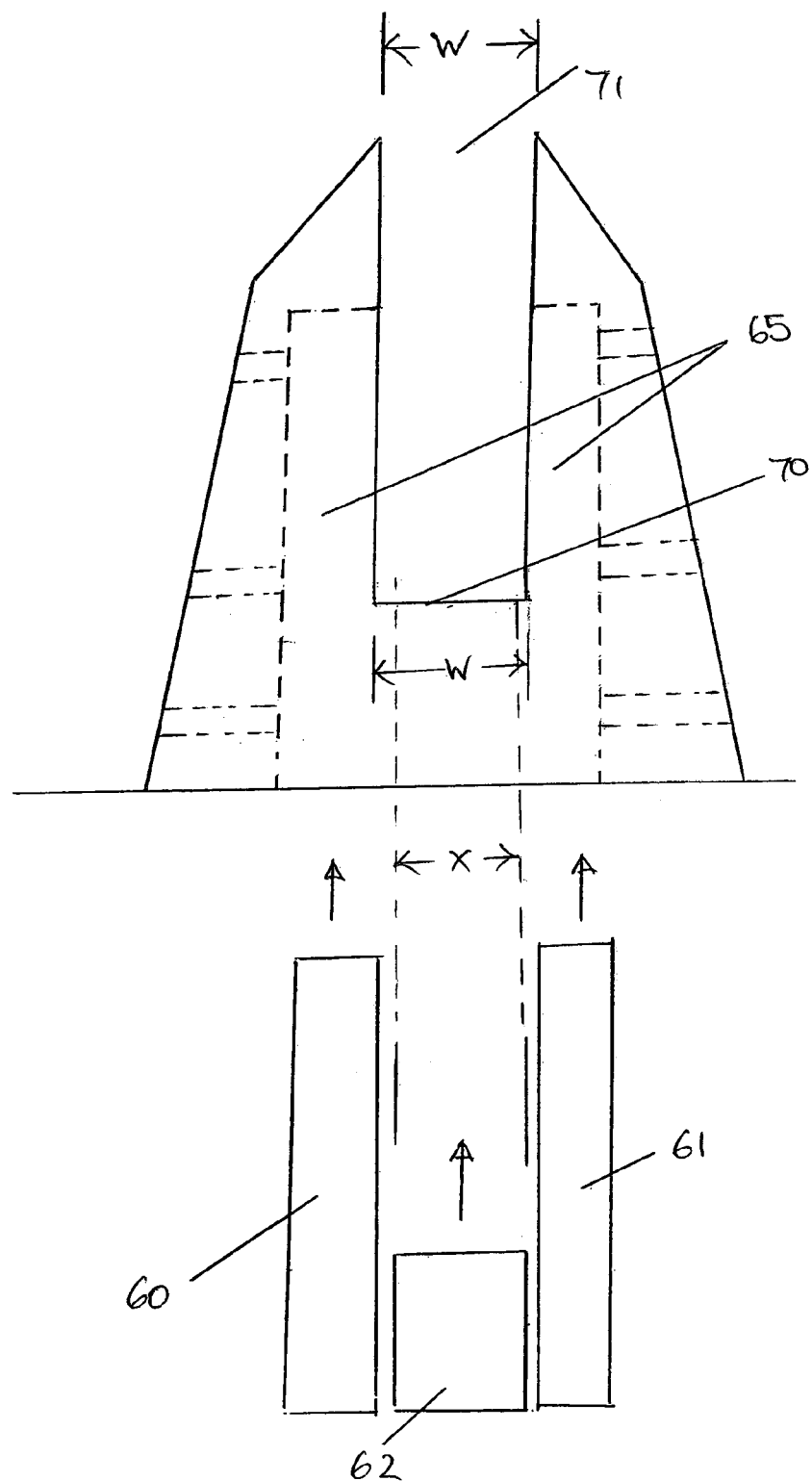
FIG. 12 shows a front view of the panel mount illustrating the movement of the clamping members into the opening of the housing.
Figure 13:
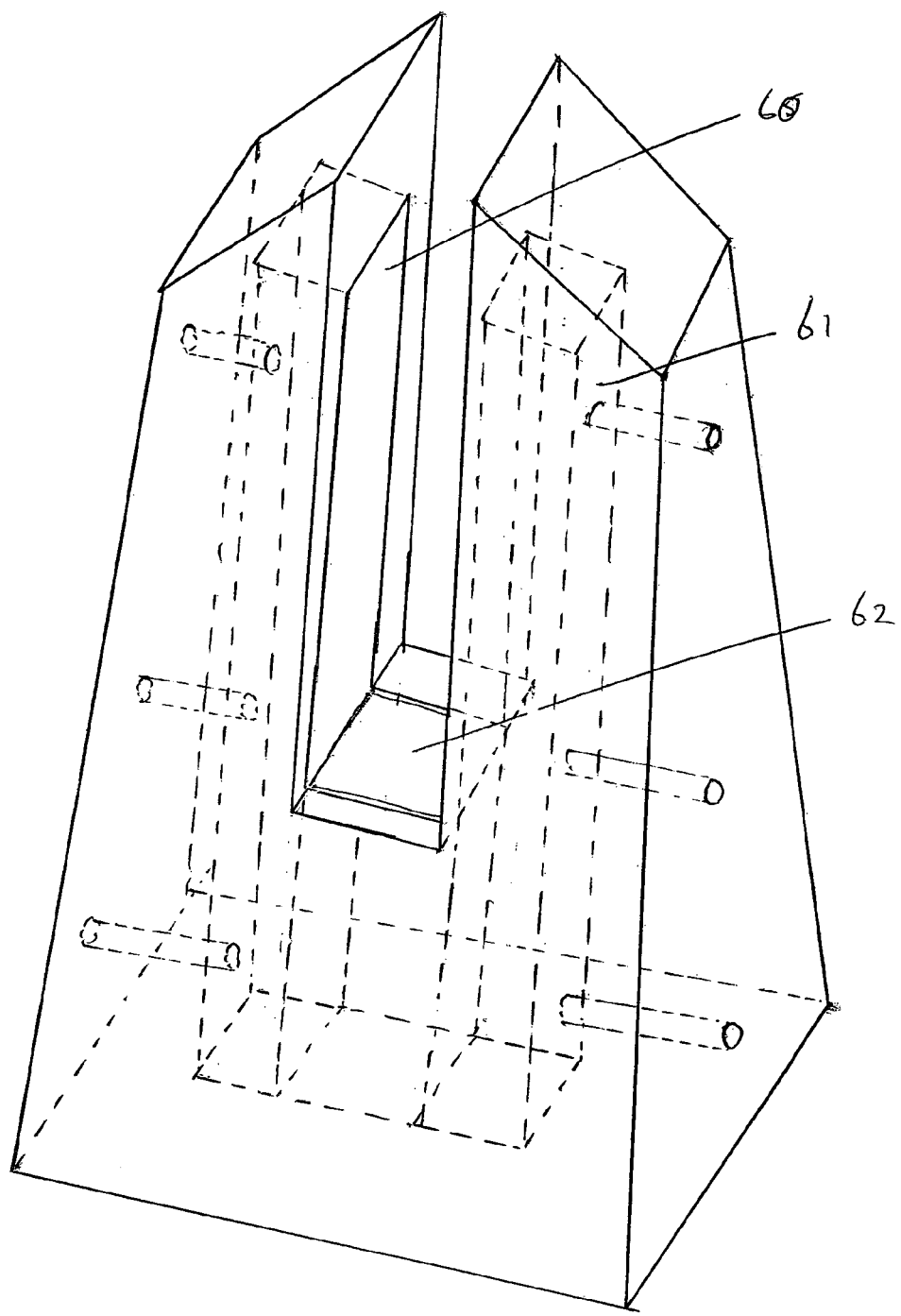
FIG. 13 illustrates the panel mount of the present invention.
Figure 14:
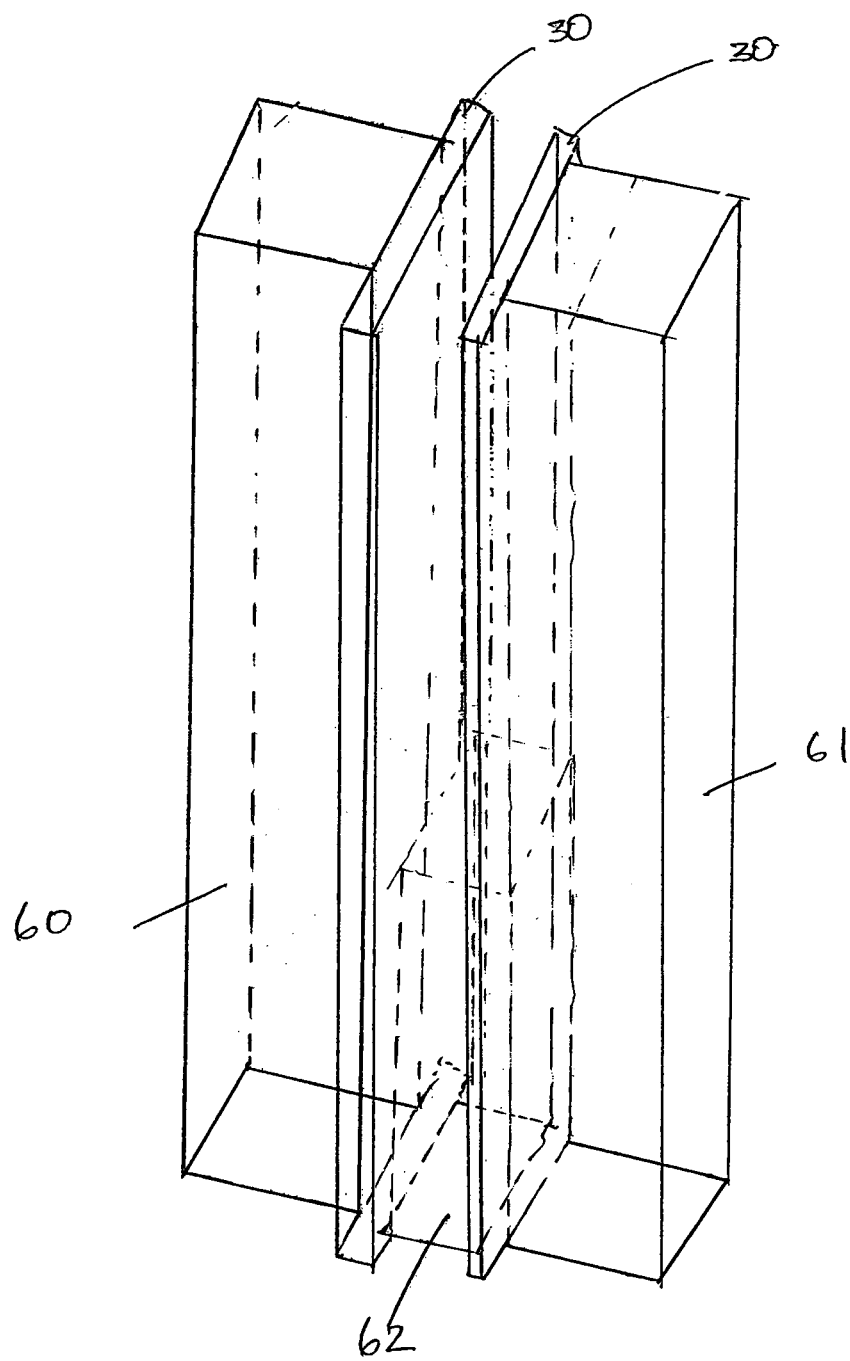
FIG. 14 illustrates the clamping members and the base members.

The housing 50 is preferably of a unitary construction and includes a slot 71 between two clamp jaws 100 and 101, to receive a pane 33. When a pane 33 is inserted into the slot 71, the edge of the pane may rest on the base of the slot 70. As shown in FIG. 11, the slot may not extend to the base end of the housing. The housing 50 includes a cavity 65 extending from the underside of the housing 50 to or towards the top of the housing 50. The cavity is of a shape to receive intermediate members 30. The housing is preferably made of stainless steel. Alternatively, other metals with similar mechanical properties may be used.

The intermediate members preferably comprise two side clamp members 60, 61 and a base member 62 in between the side clamp members 60, 61. The height of the base member 62 may be smaller than the clamp members 60, 61. When inserted in the cavity 65 of the housing, it may be contiguous the underside of the base of the slot 70 of the housing. The thickness of the base member "X" is preferably equal to the thickness of the pane "T". This is to ensure that the side clamp members 60, 61 will provide an even distribution of clamping force on the pane 33 prior to being set. The side clamp members can move laterally relative the pane 33 within the cavity 65.

The width "W" of the slot of the housing is preferably greater than the thickness "X" of the base member to accommodate panes of various thickness.

The side clamp members 60, 61 are preferably equal in size and dimensions, although different dimensions may be used. The side clamp members 60, 61 should preferably fit the cavity 65 with a sufficient allowance that enables the side clamp members 60, 61 to move laterally in the direction towards and away from the pane 33.

Since the side clamping members are separate members, this allows panes of various nominal thickness (but limited by the width "W" of the slot) to be accommodated by simply varying (for example by substitution) the thickness "X" of the base member without changing the dimensions of the side clamp members to, 61.

The side clamp members 60, 61, and base member 62 are instrumental in providing the clamping forces on the pane.

The two side clamp members 60, 61, and base member 62 are preferably made of stainless steel. Alternatively, other types of metal for example aluminium or other materials providing a similar amount of strength may be used. They are substantially rigid.

The housing 50 includes apertures to receive threaded fasteners. Each of the apertures is threaded to receive a threaded fastener. The apertures extend substantially through the side walls (e.g. the clamp jaws 100 and 101) of the housing to the cavity of the housing. In the most preferred embodiment, the housing includes three pairs of apertures, each pair of aperture on the opposite sides of the housing. In the most preferred embodiment, one pair of apertures located to allow fasteners to act at the base member 62, one pair just above and acting on the side clamp members 60, 61, and preferably one pair at or towards the upper end of the housing also acting on the side clamp member 60, 61. Each pair of apertures are preferably aligned to evenly distribute the clamping force provided by the threaded fasteners on the intermediate members. More than 3 pairs of apertures may be used to provide more rigidity.

The threaded fasteners are actuated by a user for example using a tool such as a screwdriver or allen key and provide the clamping force required to clamp the panel. The threaded fasteners are preferably grub screws, but other fastening devices may alternatively be employed.

As shown in FIG. 11, packers 30, are preferably interposed between the intermediate members 60, 61, 62 and the panel. The packers may be inserted between the opposite sides of the base member 62 adjacent to the side clamp members 60, 61. The packer 30 serves to adequately grip the panel 33 and provides protection for the hard or abrasive side clamp members. Preferably, packers may be made of cork-rubber composite, neoprene, synthetic based rubber of polypropylene. They may be made of material which has a high coefficient of friction with the material of the panel to adequately grip the panel. They are preferably elastic to accommodate any warping and uneven surfaces of the panel. Alternatively, no packer may be interposed.

The mechanics of clamping of the panel will now be explained. As shown in FIG. 11, the slot of the housing 50 receives the panel by passing the pane through the mouth of the slot 71 to eventually rest on the upper side of the base of the slot 70 of the housing (or on the base member 62). The side clamp members 60, 61, and base member 62, preferably inserted into the cavity 65 from the underside of the housing can be manually put and/or kept in place. The side clamp members 60, 61 may abut against the top end of the cavity wall and the base member 62 may abut the underside of the base of the slot 70 of the housing.

Clamping forces on the panel are generated by the tightening of the threaded fasteners. The ends of the fasteners cause the side clamp members 60, 61 to move laterally (as shown in the direction of the arrow in FIG. 11) in the direction of the panel thereby making direct or indirect contact with the panel. This is shown in FIG. 11 where the threaded fasteners are screwed in the direction of the arrow shown. The clamp members 60, 61 also enable the panel to be easily aligned to a desired position by adjusting of the threaded fasteners. Alternatively, the side clamp members 60, 61 can be moved comply with the position of the panel.

Preferably, the width "W" of the slot of the housing 50 is greater than the thickness "X" of the base member 62 (which corresponds to the thickness of the panel). This can then allow for misalignment of the panel with the elongated direction of the slot 70 of the housing to be accommodated. This also allows the panel to be adjusted or aligned to a desired position. It also allows panels of various nominal thickness to be used by simply changing the thickness of the base member 62.

In a preferred form, the positioning of the apertures allows the lower two pairs of threaded fasteners, when tightened, to provide most of the clamping forces on the panel. This allows the upper pair of threaded fasteners to be tightened less than the lower two pairs of threaded fasteners or alternatively to be sufficiently tightened without the use of a tool. Since the upper pair of threaded fasteners provides less clamping forces on the panel, the lateral stresses on the panel near the mouth of the slot of the housing are reduced. Also, the lateral stress on the housing at its upper region is reduced meaning that less deformation of the housing will occur.

Figure 15:
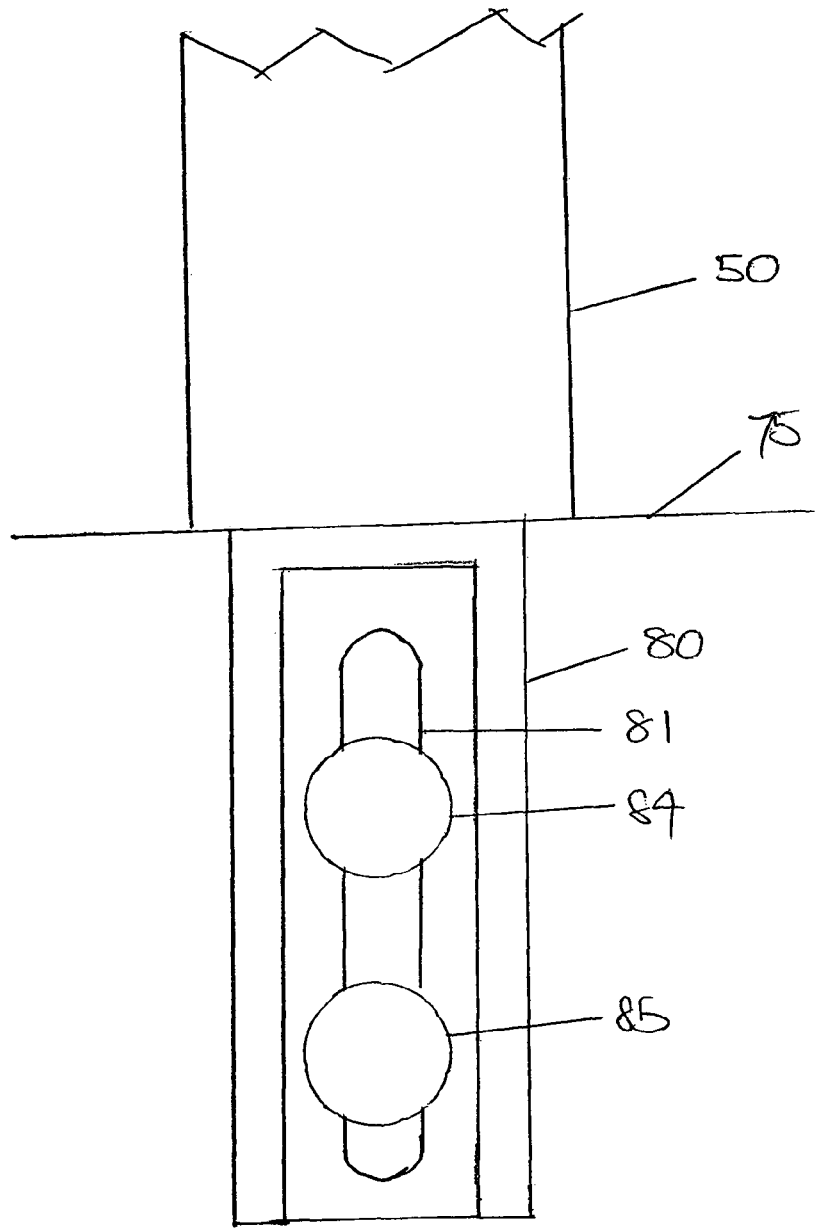
FIG. 15 shows the front view of the panel mount together with the bracket.
Figure 16:
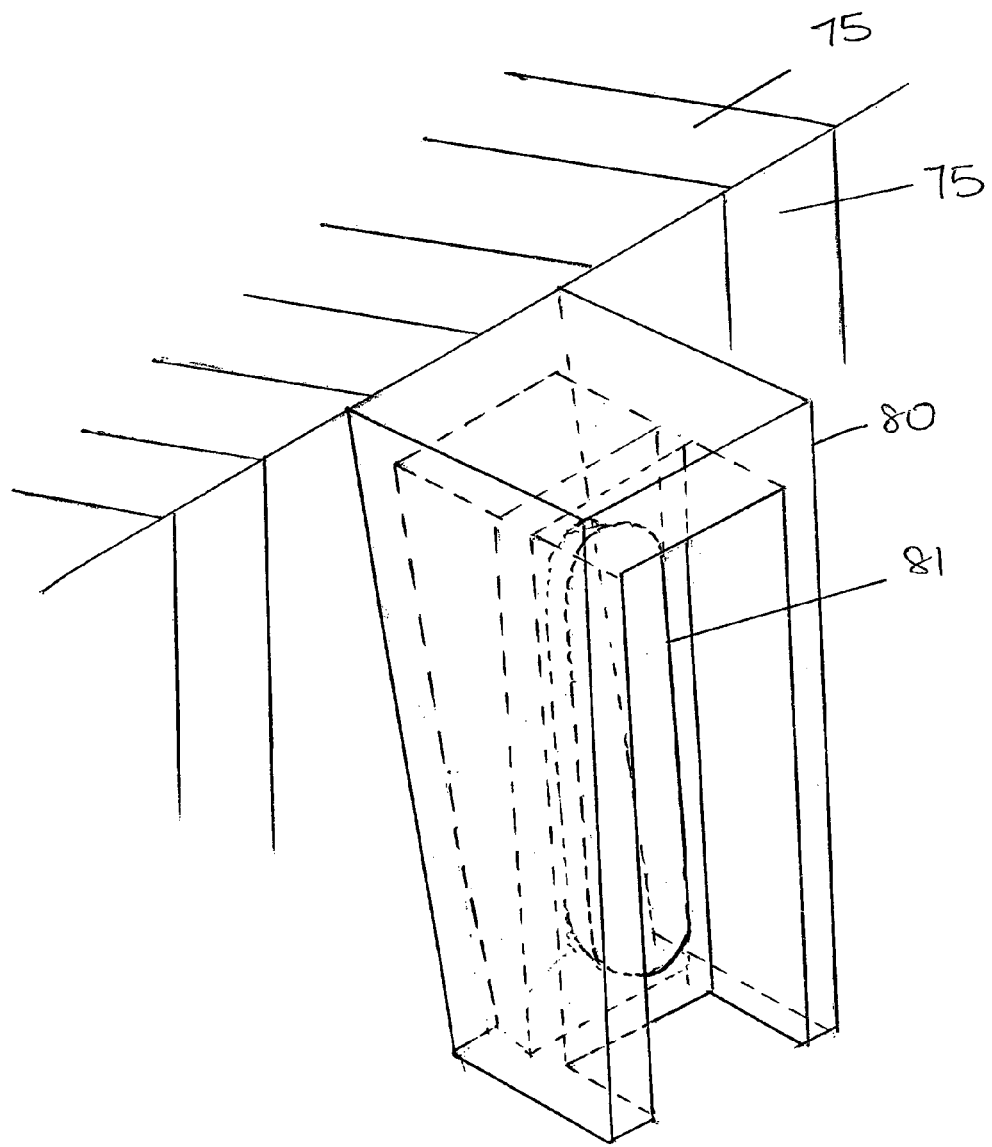
FIG. 16 illustrates the bracket mounted on a fixed structure and FIGS. 17a-d show other variations.
Figure 17A:
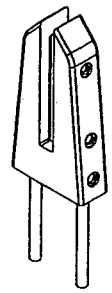
Figure 17B:
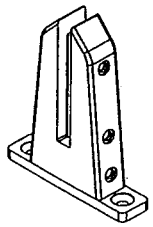
Figure 17C:
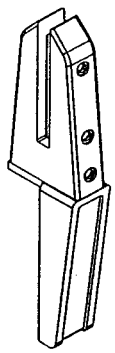
Figure 17D:
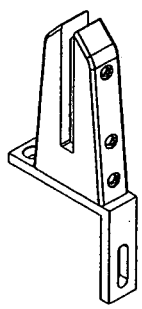

The panel mount may also be mounted on a bracket 80. This is shown in FIGS. 15 and 16. The housing 50 may be affixed to the bracket 80 by directly engaging the underside of the housing 50 with one end of bracket 80. Conventional means for affixing the housing 50 to the bracket 80 may be used such as for example a threaded fastener. The bracket 80 may be mounted on a fixed structure 75 for example a deck.

The bracket 80 includes at least an opening 81 to receive at least one fastener 84 to enable the bracket 80 to be mounted to a fixed structure 75. Preferably, the opening 81 is an elongate slot to receive fasteners to secure the bracket to the structure in a direction perpendicular to the panel. Alternatively, the opening 81 may be at least one aperture to receive a fastener FIGS. 17a-d show other variations.

The invention claimed is:

1. A panel mount for non penetrative fastening of a panel such as a glass pane, said panel mount comprising:
    clamp jaws defining an elongate slot in which an edge of a panel can be received, and
    a foot for mounting and fastening said clamp jaws to a structure,
    each clamp jaw carrying at least two threaded fasteners, said threaded fasteners being actuated by a user independently of the clamp jaws for movement in a direction lateral to the elongate direction of said slot, including when said foot is fastened to said structure, wherein the threaded fasteners of each clamp jaw are positioned to cooperate with the other threaded fasteners to operatively clamp said panel to hold said panel in said slot, irrespective of any non-parallel disposition of the plane of said panel to the elongate direction of said slot,
    intermediate members positioned on opposite sides of the slot including movably positioned side members.

2. The panel mount of claim 1, wherein said foot includes a means to fasten, to fasten to or with said structure.

3. The panel mount of claim 1, wherein there is at least one pair of clamp jaws.

4. The panel mount of claim 1, wherein each clamp jaw defines an elongate rectilinear slot.

5. The panel mount of claim 1, wherein a mouth opening is defined by distal ends of each slot and through which part of said panel enters said slot.

6. The panel mount of claim 1, wherein said clamp jaws are, at their proximal end, engaged to said foot.

7. The panel mount of claim 1, wherein said foot is a foot plate positioned so that the elongate slot extends in a direction normal to the plane of said foot plate.

8. The panel mount of claim 1, wherein said threaded fasteners extend into said slot.

9. The panel mount of claim 1, wherein said intermediate member is a protective member that prevents direct contact of said threaded fasteners with said panel.

10. The panel mount of claim 1, wherein said intermediate member is a planar member or elongate member that extends parallel to the elongate direction of the slot.

11. The panel mount of claim 1, wherein said intermediate member is located at each side of said slot, each intermediate member to be reacted on by the threaded fasteners held by the clamp jaws.

12. The panel mount of claim 1, wherein each said intermediate member extends from said distal end of each said clamp jaw to or towards the opposite end of said slot.

13. The panel mount of claim 1, wherein each said threaded fastener is located in a threaded hole passing through a respective clamp jaw.

14. The panel mount of claim 1, wherein the slot defined by said clamp jaws terminates short of the foot at a slot base.

15. The panel mount of claim 14, wherein the slot base engages with an edge of said panel.

16. The panel mount of claim 1, wherein said threaded fasteners are actuated by a user when the panel mount is fastened to the fixed structure.

17. The panel mount of claim 1, wherein the panel mount is one that is used as part of a glass pane incorporating balustrade system.

18. The panel mount of claim 1, wherein the panel mount is one that is used as part of a glass pane defined fence.

19. The panel mount of claim 1, wherein the panel mount is one that is used as part of a glass pane defined wall.

20. The panel mount of claim 1, wherein said slots are open sided.

21. A method of mounting a panel such as a glass pane relative a fixed structure, comprising:
    securing, in a spaced apart configuration to a fixed structure, at least two panel mounts as claimed in claim 1 in a condition wherein their slots are substantially in alignment,
    inserting a panel into the slot of each panel mount,
    holding the panel in the desired position, and
    adjusting the threaded fasteners to clamp said panel in place in said desired position.

22. A panel defined wall, partition or fence or panel including balustrade system wherein a panel is edge supported by at least one panel mount as claimed in claim 1.

* * * * *

UNITED STATES PATENT AND TRADEMARK OFFICE
CERTIFICATE OF CORRECTION

PATENT NO.       : 8,500,110 B2  
APPLICATION NO.  : 12/452466  
DATED            : August 6, 2013  
INVENTOR(S)      : Warwick James Allen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 716 days.

Signed and Sealed this

Fifteenth Day of September, 2015

Michelle K. Lee
*Director of the United States Patent and Trademark Office*